March 16, 1971 — L. A. MISKIEWICZ — 3,570,225
SAFETY SHIELD
Filed June 2, 1969 — 2 Sheets-Sheet 1
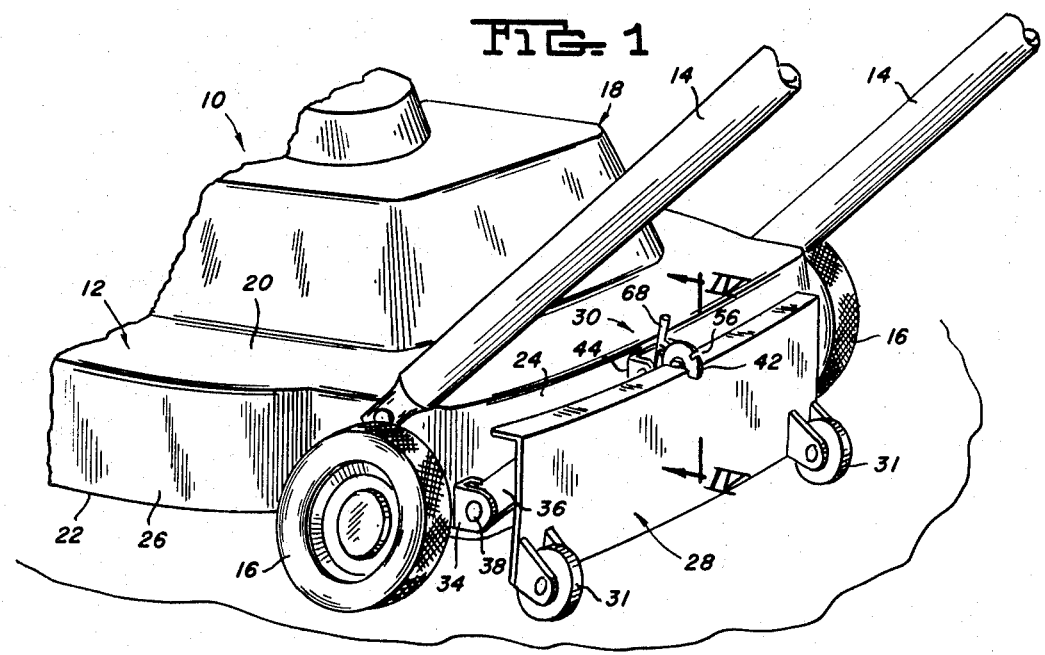
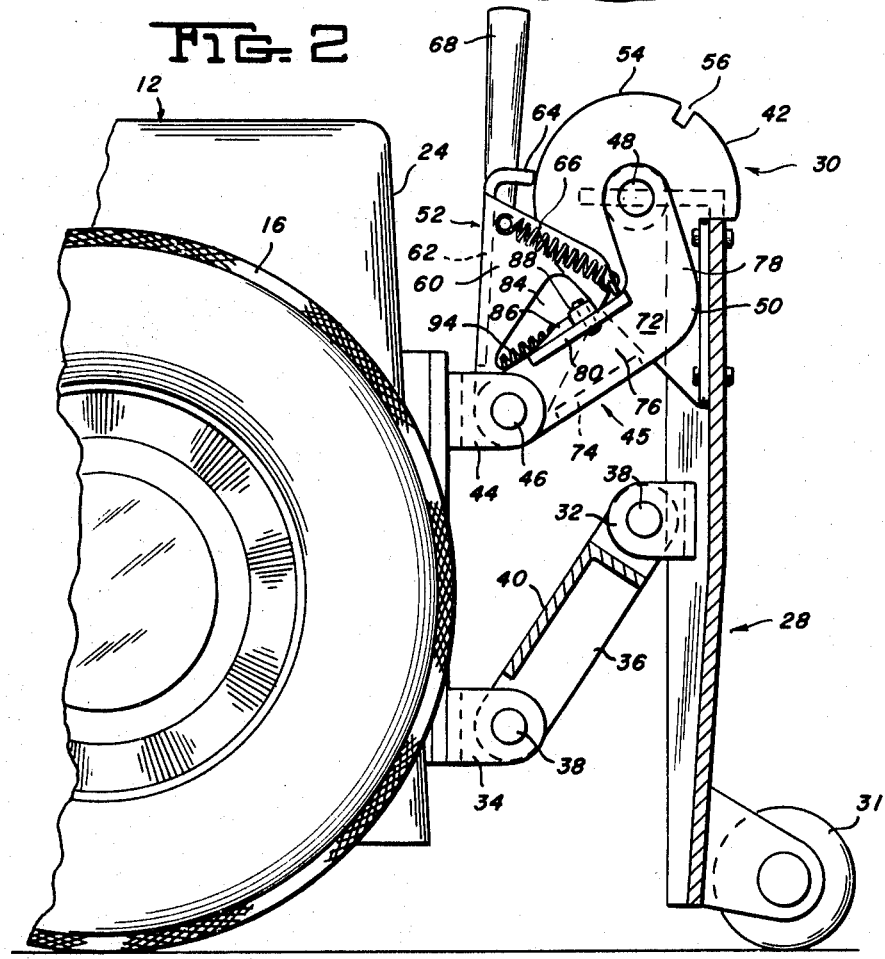
INVENTOR
LEONARD A. MISKIEWICZ
By Braun, Murray, Flick & Peckham
his Attorneys

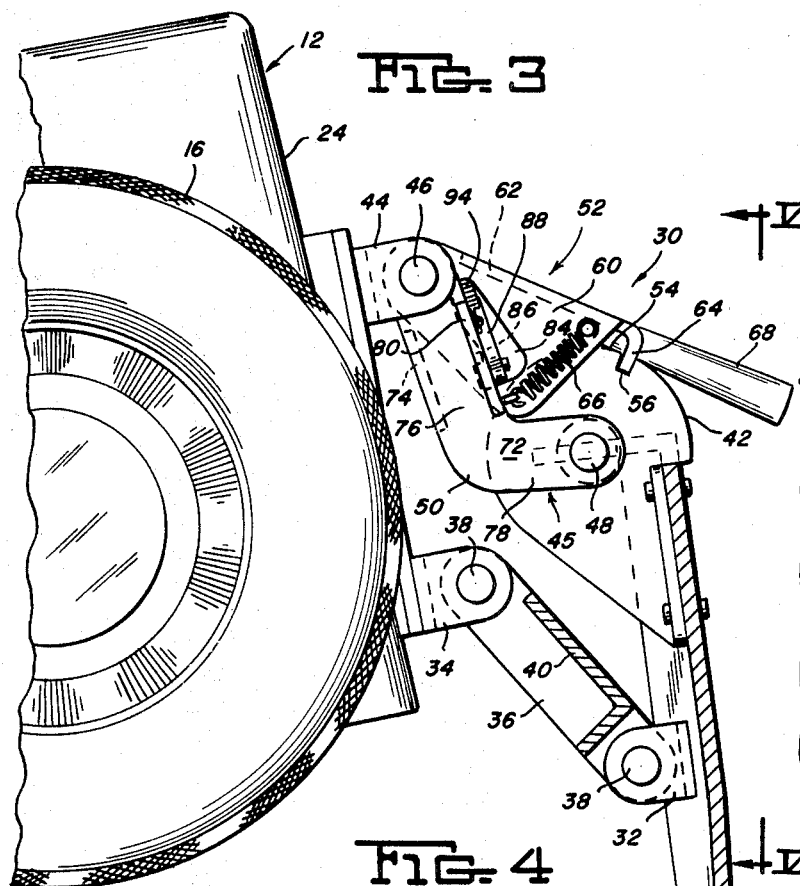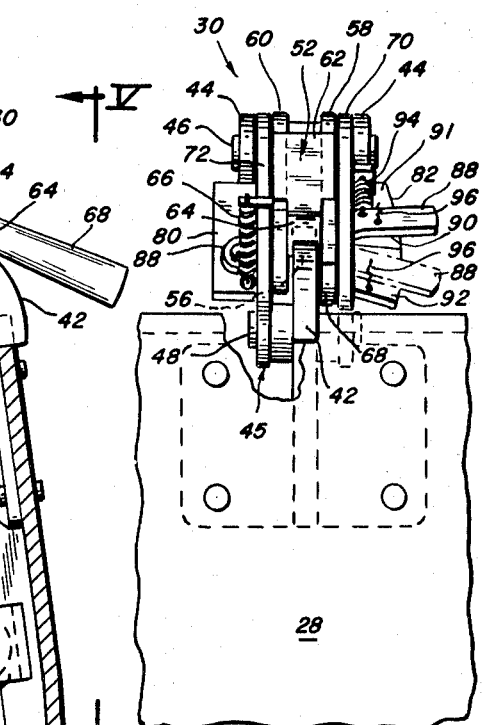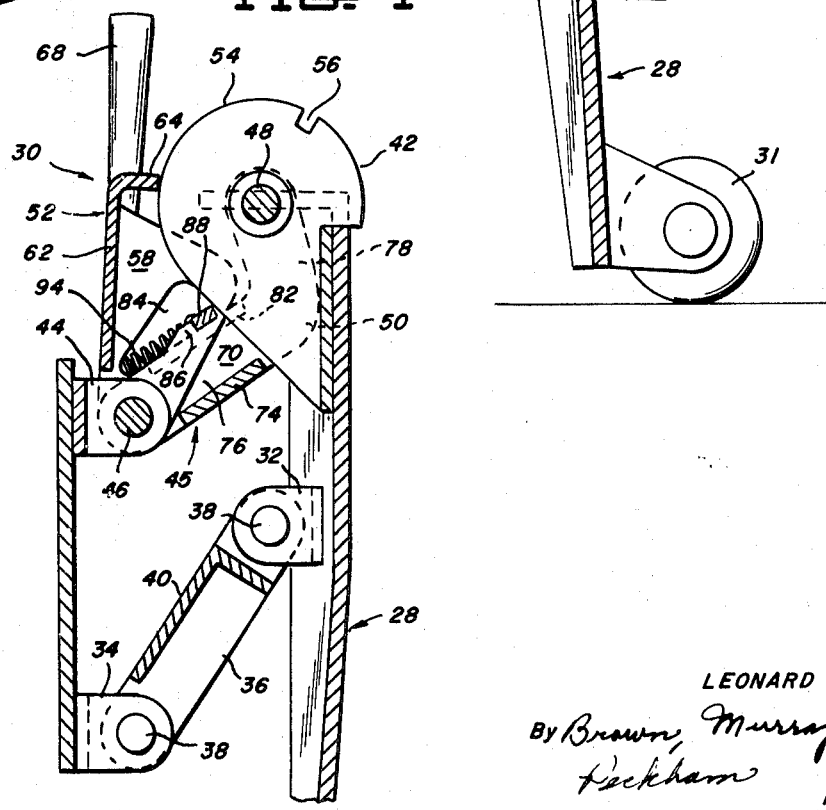

3,570,225
SAFETY SHIELD
Leonard A. Miskiewicz, 219 Sprucewood St.,
Pittsburgh, Pa. 15210
Filed June 2, 1969, Ser. No. 829,575
Int. Cl. A01d 75/20
U.S. Cl. 56—25.4                                                4 Claims

ABSTRACT OF THE DISCLOSURE

A safety shield for a power driven lawnmower and a control mechanism operatively interconnected between the lawnmower and the safety shield is disclosed. The control mechanism is operative to lock the shield and mower in fixed positions relative to each other when the rear end of the mower is raised a predetermined distance above the ground, and is also operative to terminate electrical energy supplied to the power means driving the mower when the mower is so raised.

BACKGROUND OF THE INVENTION

This invention relates to safety shields and novel control mechanisms for use with powered apparatus. The invention has particular application to powered vegetation cutting apparatus, such as rotary type lawnmowers, and will be described hereinafter in conjunction therewith, however, the invention may be modified and adapted to structurally complement other powered apparatus wherein like safety features resulting from use of the invention are required or desirable.

It may be explained that there is an ever present problem or danger, particularly with power lawnmowers of the rotary type, of small stones, twigs and the like being propelled by the rotary blade of the mower and striking the operator thereof. Also, when such mowers are intentionally or accidentally raised above the ground while the motor is in operation, there is a possibility of the accidental insertion of the feet or other portions of the operator's body into the path of the rotary blades of the mower.

In an effort to overcome the aforementioned problems, I have disclosed in U.S. Patent No. 3,212,245, a safety shield which is mounted on a lawnmower whereby any debris, such as small stones, twigs and the like which are propelled by the rotary blade of the mower will be deflected by the shield and thereby be prevented from striking the operator, and when the mower is either intentionally or accidentally raised above the ground while the motor is in operation, the shield will be maintained engaged with the ground thereby shielding the rotary blades and preventing the accidental insertion of various portions of the body of the operator into the path of the rotary blades. There is also disclosed in this patent, a means for halting the operation of the mower upon raising the mower a predetermined distance above the ground.

SUMMARY OF THE INVENTION

The present invention is a modification of the type apparatus disclosed in the above mentioned patent, and as an overall object, the present invention also seeks to overcome the above mentioned problems by providing a motor driven lawnmower with a shield and a novel control mechanism operatively interconnected between the shield and lawnmower for interrupting electrical power supplied to the motor upon predetermined upward movement of the mower relative to the ground.

Briefly and in accordance with the invention, there is provided in combination with a powered apparatus including a housing and a power means for driving a member disposed within the housing, a safety shield supported on the housing such that the housing and shield are movable relative to each other, and a control mechanism operatively interconnected between the housing and the shield. The power means has associated therewith an electrical conductor for supplying electrical energy thereto and the control mechanism includes a switch means connected in circuit with the electrical conductor and a trigger means actuated by predetermined movement of the housing relative to the shield for effecting operation of the switch means whereby electrical energy supplied to the power means is terminated.

The above and other objects, features and advantages of the invention will become apparent from the following detailed description thereof when taken in conjunction with the accompanying drawings.

BRIEF DESCRIPTION OF THE DRAWINGS

FIG. 1 is a pictorial or perspective view of a rotary-type power lawnmower provided with the safety shield attachment and control mechanism of the present invention;

FIG. 2 is a side elevation view, partly in section, of the safety shield attachment and control mechanism shown in FIG. 1, illustrating the safety shield and control mechanism and parts thereof in what may be considered a running position;

FIG. 3 is a side elevation view similar to FIG. 2 but illustrating the lawnmower in a raised position and the various parts of control mechanism in position for stopping operation of the power mower;

FIG. 4 is a cross-sectional view through the control mechanism taken substantially along the line IV—IV in FIG. 1; and FIG. 5 is a view of the control mechanism as viewed from line V—V of FIG. 3.

DESCRIPTION OF THE PREFERRED EMBODIMENTS

Referring now to the drawings wherein like reference numerals refer to like parts throughout the several views, there is illustrated a power mower 10 having a housing 12, a partially shown operational handle 14 and four movable wheels 16 of which only the two rear wheels are shown. The mower 10 may be provided with either an electric motor or gasoline engine as a power means, as will appear more fully hereinafter, for driving a rotary blade (not shown) disposed within the housing 12. The power means for the mower 10 is designated generally at 18 in FIG. 1.

The housing 12 comprises a generally horizontal upper wall 20 and a peripheral wall 22 depending therefrom. The peripheral wall 22 comprises a rear wall portion 24, a front wall portion (not shown), and side wall portions 26.

In accordance with the invention, the power mower 10 is provided with a safety shield member 28 and a control mechanism, shown generally at 30, which is operatively interconnected between housing 12 and the shield 28. The shield member 28 extends transversely of the housing 12 and rotatably mounted on the lower edge of the shield member 28 are rollers 31 which support the shield 28 spaced from the ground and which facilitate the movement of the shield 28 over the ground. As shown, the shield member 28 is positioned adjacent to the rear wall portion 24 of the peripheral wall 22 and is supported on the housing 12 such that the housing 12 and the shield member 28 are movable relative to each other. To this end, hinge-like brackets 32 are secured to the inner surface of the shield 28 at its opposite ends. The bracket 32 shown in FIGS. 2, 3, and 4 being that bracket located on the right side of the shield 28 as viewed in FIG. 1. Similarly, barckets 34 are secured to the opposite ends of the rear wall portion 24 of housing 12 and link members 36 are each pivotally secured at their opposite ends to an associated pair of brackets 32, 34 by means of pins 38. A stabilizing bar 40, which extends transversely of the housing 12 is secured at each of its opposite ends to the link members 36.

A cam member 42, which will be described more fully hereinafter, is secured to the shield 28 intermediate the opposite ends thereof, above the brackets 32, and at the top edge of the shield 28. Another hinge-like bracket 44 is secured to the rear wall portion 24 of housing 12 substantially opposite the cam member 42 and a substantially L-shaped, bifurcated body member 45, to be described more fully hereinafter, is pivotally secured at its opposite ends to the bracket 44 and cam member 42 by means of pins 46 and 48.

From the foregoing, it will be understood that the shield member 28 and housing 12 are interconnected at three locations and due to the pivotal interconnection of the links 36 and body member 45 between the housing 12 and shield 28 and the housing 12 are movable relative to each other. Accordingly, the shield 28 can move upwardly and downwardly with the housing 12 remaining stationary; or the housing 12 can move upwardly and downwardly with the shield 28 remaining stationary; or both can move alternately in either an upward or downward direction relative to each other.

It may be pointed out, that the view shown in FIG. 2 illustrates the shield 28 in its raised uppermost position with the elbow-like portion 50 of body member 45 in abutting engagement with the inner surface of the shield 28. As is known, on conventional lawnmowers, means are provided to adjust the height of the housing 12 relative to the wheels 16 and thus relative to the ground. In a normal running condition, the housing 12 would be raised above the ground more so than is shown in FIG. 2 in order that elbow-like portion 50 not be in engagement with shield 28 to thereby permit the shield to move upwardly a limited extent to follow slight irregularities in the ground, however, upward movement thereof would be limited by the abutting engagement of elbow-like portion 50 with the inner surface of shield 28. Thus, the shield 28 provides an effective safety means to prevent the accidental insertion of portions of the operator's body into the path of the rotary blades of the mower during normal running conditions. Further, the shield 28 will deflect debris propelled by the rotary blade and prevent it from striking the operator.

As will be understood to those skilled in the art, there are times, such as when cutting grass on an upwardly or downwardly sloping embankment, when the operator may either accidentally or intentionally raise the back portion of the mower above the ground. At such times, there is a danger that if the operator falls, he may accidentally insert portions of his body into the path of rotary blades thereby causing serious injury to himself. Such a condition, i.e., with the back end of the mower raised above the ground, is depicted in FIG. 3. Also shown in FIG. 3 is the position in which the control mechanism 30 is operative to lock the housing 12 and shield 28 in a fixed position relative to each other and to stop operation of the power means 18. In the position shown in FIG. 3, the shield is locked in place by the control mechanism 30, as will be set forth more fully hereinafter, and the distance between the lower edge of the shield 28 and the rotary blades (not shown) is such that the shield member 28 will maintain, for example, the toes of a foot engaged on the lower edge portion of the shield 28, spaced from the rotary blades. Furthermore, with the shield 28 locked in position and the rollers 31 engaged with the ground, the mower 10 will be inclined with respect to the ground. Therefore, should the legs of the operator be accidentally inserted between the ground and the lower edge of the shield member, the mower 10 will be further inclined with respect to the ground and, therefore, the rotary blades thereof will be spaced from the feet of the operator a safe distance.

The control mechanism 30 comprises the cam member 42, the L-shaped body member 45 and a trigger member 52. The cam member 42 has a cam surface 54 and a notch 56 extending inwardly of the cam surface 54. The trigger member 52 comprises a bifurcated body member having spaced apart side wall portions 58 and 60 joined together along an edge of the respective side wall portions 58 and 60 by a portion 62. The trigger member 52 is pivotally mounted on the pin 46 with the cam member 42 being received between the space provided between the side wall portions 58 and 60. The portion 62 of the trigger member 52 has an extension terminating in a hook-like portion 64 which is adapted to follow the cam surface 54 when the rear end of the mower is raised above the ground. A spring 66 connected between the trigger member and body member 45 resiliently urges the portion 64 into contact with the cam surface 54, and upon predetermined upward movement of the housing 12 the hook-like portion 64 is caused to enter the notch 56 locking the housing and shield in a fixed position relative to each other. A handle 68 is secured to the side wall 58 of trigger member 52 for lifting the trigger member 52 to raise the portion 64 thereof out of the notch 56 when desired.

The bifurcated L-shaped body member has two spaced apart side portions 70 and 72 joined together by a portion 74. Each of the side portions 70, 72, has an elongated longitudinal portion 76 and a relatively short transverse portion 78. Each of the longitudinal portions 76 are pivotally secured to the pin 46 and each of the transverse portions 78 are pivotally secured to the pin 48. As best seen in FIG. 5, the portions 70 and 72 of body 45 are spaced apart with the trigger number 52 being received between them.

The L-shaped body member 45 has two laterally extending flange-like portions 80 and 82. Flange portion 80 is integral with the side portion 70 and flange portion 82 is integral with the side portion 72 of the body member 45.

Returning now to a further description of trigger member 52, it can be seen that the central portion thereof has an opening 84 therethrough which extends through both of the side wall portions 58, 60. Along the bottom edge of the opening 84 in each of the side wall portions 58, 60 there is a raised portion 86. The raised portions 86 of the trigger member 52 are detent means for normally blocking movement of an arm member 88 which forms a part of a switch means carried by the L-shaped body member 45 as will now be described.

As best seen in FIG. 5, the switch means carried by the L-shaped body member 45 includes the arm member 88 which is pivotally secured at one end thereof to the flange portion 80 of L-shaped body member 45. The arm 88 extends through the openings 84 in the trigger member 45 and terminates in a switch contact portion 90. The underside of the switch contact portion 90 of arm 88 is preferably comprised of a layer of conductive material which may be disposed thereon in any suitable manner. Another switch contact 92 is provided on the forward surface portion of the flange 82. The switch contact 92 is likewise preferably comprised of a layer of conductive material which may be disposed on the forward surface portion of the flange 82 in any suitable manner. The rear surface portion 91 of the flange 82 is preferably comprised of a layer of electrical insulating material which may be disposed thereon in any suitable manner. A spring 94 is secured at one end thereof to the rear portion of the flange 82 and at its opposite end to the arm 88 to resiliently urge the arm 88 into contact with detent means 86 and contact portion 90 thereof away from the contact 92.

The arm 88 is shown in FIG. 5 in a dotted line position to indicate its normal position and in full line to indicate its position when the switch means has been opened.

As stated above, the power means 18 for the mower 10 may be either a gasoline engine or an electric motor. As is known, in a gasoline engine an electrical conductor is associated therewith which serves to carry electric current from a magneto to a spark plug; and in the case of an electric motor being the power means for the mower, an electrical conductor is associated therewith which serves to carry electric current from a remote source to the electric motor. In both cases, electrical energy supplied to the power means can be terminated by the opening of a switch wired in series with the conductor associated with the power means.

Such a conductor is diagrammatically represented by the leads 96 shown in FIG. 5, one lead being connected to the switch contact portion 90 of arm 88 and the other being connected to the switch contact 92 provided on the forward surface of the flange 82.

Operation of the switch means to terminate electrical energy supplied to the power means 18 is effected upon predetermined upward movement of the housing 12 relative to the shield 28. With the housing 12 and shield 28 in the position shown in FIG. 2, the detent means 86 block movement of the arm 88, and the contacts 90 and 92 are maintained in engagement with each other thereby permitting electrical energy to be supplied to the power means 18. As the rear end of the mower 10 is raised, the portion 64 of trigger member 52 rides along the cam surface 54 in a clockwise direction as viewed in FIGS. 2 and 4. During such movement, the trigger member 52 and L-shaped body member 45 are maintained in position relative to each other. However, continued upward movement of the housing 12 relative to the shield 28, eventually causes the portion 64 to enter the notch 56, which as described above locks the housing 12 and shield 28 in a fixed position relative to each other. When portion 64 enters the notch 56, the trigger member 52 moves downwardly (clockwise) relative to L-shaped body member 45 causing the detent means 86 to move downwardly out of the path of arm 88. The arm 88 then moves under the influence of spring 94 to the full line position shown in FIG. 5 to open the switch contacts 90, 92 thereby terminating electrical energy supplied to the power means 18 and halting its operation.

In order to lower the housing 12 relative to the shield 28, the handle 68 must be raised to lift the portion 64 of trigger member 52 from the notch 56. With the housing and shield returned to their normal operative positions (FIG. 2), the switch means can then be closed, as the detent means 86 will be in a raised position, by manually moving arm 88 forwardly over the detent means 86 to the position shown in FIGS. 4 and 5. The control mechanism 30 will then again be operative to function as above described when the rear end of the mower 10 is again raised above the ground such as to cause the portion 64 of the trigger 42 to enter the notch 56.

Although the present invention has been shown in connection with a lawnmower, it will be readily apparent that the invention can be adapted to other apparatus wherein like safety features are desired. Also, the shield and control mechanism of the present invention may, if desired, be mounted on the front, rear or both ends of a lawnmower or such other apparatus. Accordingly, various changes in form and arrangement of parts to suit requirements may be made in the above described embodiment of the invention without departing from the spirit and scope of the present invention.

I claim as my invention:

1. In combination with vegetation cutting apparatus adapted to move over the ground, including a housing having a depending peripheral wall and power means for driving rotary blades disposed within said housing, said power means having associated therewith an electrical conductor for supplying electrical energy thereto, a shield member positioned adjacent said peripheral wall, means pivotally secured at one end to said housing and at the other end thereof to said shield member such that said housing and said shield member are movable relative to each other, and a control mechanism operatively interconnected between said housing and said shield member, said control mechanism comprising a normally closed switch means connected in circuit with said electrical conductor, a cam member mounted on said shield member, said cam member having a cam surface and a notch extending inwardly of said cam surface, and a trigger means pivotally mounted on said housing, said trigger means having a portion adapted to follow said cam surface and upon predetermined upward movement of said housing relative to said shield member said portion being adapted to enter said notch for effecting opening of said switch means whereby electrical energy supplied to said power means is terminated.

2. The combination as defined in claim 1 wherein said shield member is positioned exteriorly of said housing and adjacent to a rear wall portion of said peripheral wall, said shield member extending transversely of said housing and for substantially the entire width of said rear wall portion.

3. The combination as defined in claim 1 wherein said control mechanism further includes first spring means acting on said trigger means for resiliently urging said portion of said trigger means into contact with said cam surface.

4. The combination as defined in claim 2 wherein said trigger means has a portion including detent means and said control mechanism further includes a substantially L-shaped body member having an elongated portion and a relatively short transverse portion, said elongated portion being pivotally secured to said housing and said transverse portion being pivotally secured to said cam member, said switch means being carried by said L-shaped body member, said switch means comprising a pair of switch contacts, one of said pair of contacts forming a part of an arm member pivotally mounted on a first portion of said L-shaped body member and the other one of said pair of contacts being carried by a second portion of said L-shaped body member, and a second spring means acting on said arm member for resiliently urging said arm member into contact with said detent means and away from said other contact, said predetermined upward movement of said housing effecting movement of said portion of said trigger means into said notch under the influence of said first spring means which lowers said detent means thereby permitting said arm under the influence of said second spring means to move away from said other contact.

References Cited

UNITED STATES PATENTS

| | | | |
|---|---|---|---|
| 2,720,930 | 10/1955 | Newhouse et al. | 180—14.5 |
| 2,796,944 | 6/1957 | Clement, Jr. | 180—96 |
| 2,973,613 | 3/1961 | Hagedorn | 56—25.4 |
| 3,057,140 | 10/1962 | Ridenour et al. | 56—255X |
| 3,106,812 | 10/1963 | McDonagh | 56—25.4 |
| 3,190,061 | 6/1965 | Gilbertson | 180—96X |
| 3,212,245 | 10/1965 | Miskiewicz | 56—25.4 |

LOUIS G. MANCENE, Primary Examiner

J. A. OLIFF, Assistant Examiner

U.S. Cl. X.R.

180—96; 200—61.52